United States Patent [19]

Kuniyoshi et al.

[11] Patent Number: 4,501,432
[45] Date of Patent: Feb. 26, 1985

[54] CYLINDER-HEAD COVER GASKET

[75] Inventors: Toru Kuniyoshi, Ichinomiya; Ryoji Okumoto, Nakashima, both of Japan

[73] Assignee: Toyoda Gosei Co., Ltd., Nishikasugai, Japan

[21] Appl. No.: 590,052

[22] Filed: Mar. 15, 1984

[30] Foreign Application Priority Data

Mar. 17, 1983 [JP] Japan ............... 58-39424[U]

[51] Int. Cl.³ .............................................. F16J 15/06
[52] U.S. Cl. .................................. 277/168; 277/235 B
[58] Field of Search ............... 277/167.5, 168, 169, 277/170, 171, 172, 235 B

[56] References Cited

U.S. PATENT DOCUMENTS

| | | | |
|---|---|---|---|
| 1,380,454 | 6/1921 | Wilson | 277/168 |
| 2,230,725 | 2/1941 | Nathan | 277/170 |
| 2,815,549 | 12/1957 | Olson | 277/167.5 |
| 3,588,201 | 6/1971 | Schmidt | 277/169 |
| 4,202,526 | 5/1980 | Muller et al. | 277/168 |

Primary Examiner—Robert I. Smith
Attorney, Agent, or Firm—Cushman, Darby & Cushman

[57] ABSTRACT

A cylinder-head cover gasket being inserted to the sealing groove with a wedge shaped space defined by two plates of a cylinder-head cover has a upper projecting portion, which is engaged with the wedge shaped space of the sealing groove. The whole space of the groove is filled with the gasket, so that the gasket does not run off to the wedge shaped space, resulting in the improved sealing.

2 Claims, 4 Drawing Figures

CYLINDER-HEAD COVER GASKET

BACKGROUND OF THE INVENTION

1. Field of The Invention

This invention relates to an improved cylinder-head cover gasket.

2. Description of The Prior Art

A cylinder-head cover gasket is disposed between a cylinder-block and a cylinder-head cover of an engine, so as to keep the air tightness therebetween. The conventional cylinder-head cover is produced of aluminium die casting and the like. A groove is formed at one side of the cover connecting with the cylinder-block, wherein a gasket is inserted. The section of the groove is U-shaped or square shaped.

In recent years, the cylinder-head cover made of aluminium die casting has been replaced with that made of pressed iron plates. Such cylinder-head cover of pressed iron plates is shown in FIG. 4, wherein a U-shaped groove 2a to support a gasket is defined with each surface of two plates 21, 22. The two plates 21, 22 are in contact with each other at the portion near of the end thereof. However, such U-shaped groove 2a for inserting the gasket 10 does not have a perfect U-shape or square cross section. Therefore the portion where the plates 21 and 22 are in contact with each other is wedge shaped to define the space 2b at the bottom of the groove.

As shown in FIG. 4, the conventional cylinder-head cover gasket is inserted to the groove 2a of the cylinder-head cover, then the cylinder-head cover 2 is fastened to the cylinder block tightly. In this case, the gasket 10 runs off to the wedge shaped space 2b, a condition not appreciated prior to this invention, so that the sealing may well be unsufficient because of the weak compression of the gasket 10 pressed between the cylinder-head cover 2 and the cylinder-block 3.

SUMMARY OF THE INVENTION

Therefore, the primary object of the present invention is to provide a gasket with an excellent sealing for the aforesaid type cylinder-head cover with a groove made of two plates.

DETAILED DESCRIPTION OF THE INVENTION

The cylinder-head cover gasket according to the present invention is inserted to a sealing groove defined by the both ends of the contacting two plates, and this gasket is characterized by the upper portion thereof projecting towards the corner between the two plates at the bottom of the sealing groove.

The gasket according to the present invention has an upper projecting portion to fill the wedge shaped space at the bottom of the cylinder-head cover, thereby the cross section of the upper portion is shaped along the cross section of the groove. Thus, the upper projecting portion of the gasket is formed to be engaged with the sealing groove of the cylinder-head cover. The conventional cylinder-head covers made of pressed plates generally have an inner plate extending in the vertical direction to the cylinder-block, while the other outer plate is cranked. Thereby the wedge shaped space as a gasket groove is defined in a square-like shape including a triangle-like shape at the inner side.

Therefore a gasket with an upper portion can be engaged with such a conventional cylinder-head cover. As a whole shape of this gasket is similar to that of the conventional gasket, which is endless and elliptic.

The lower portion of the gasket of the present invention to contact with the cylinder-block may be larger than the upper portion of the gasket, or may be widened according to the sectional shape of the sealing groove, similarly as the conventional gasket.

The cylinder-head cover gasket of the present invention has such an effect that the gasket compressed between the cylinder-head cover and the cylinder-block seldom run off, because the wedge shaped space of the sealing groove is filled with the upper projecting portion of the gasket. Therefore, the gasket of the present invention can be fastened with a sufficient strength so as to cause an excellent sealing effect.

DESCRIPTION OF THE PREFERRED EMBODIMENT

Figure 1:
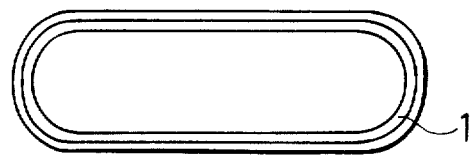
FIG. 1 is a plane view showing a preferred embodiment of the gasket according to the present invention.
Figure 2:
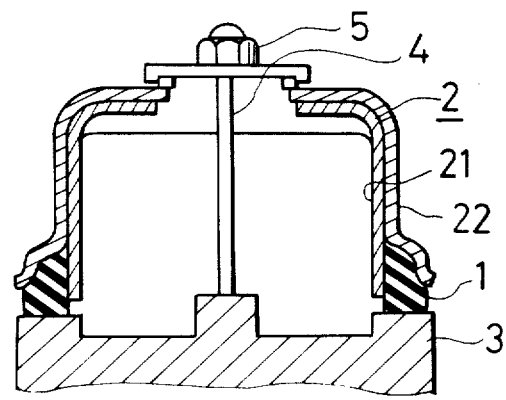
FIG. 2 is a cross sectional view of the main part of an engine using the gasket shown in FIG. 1.
Figures 3, 4:
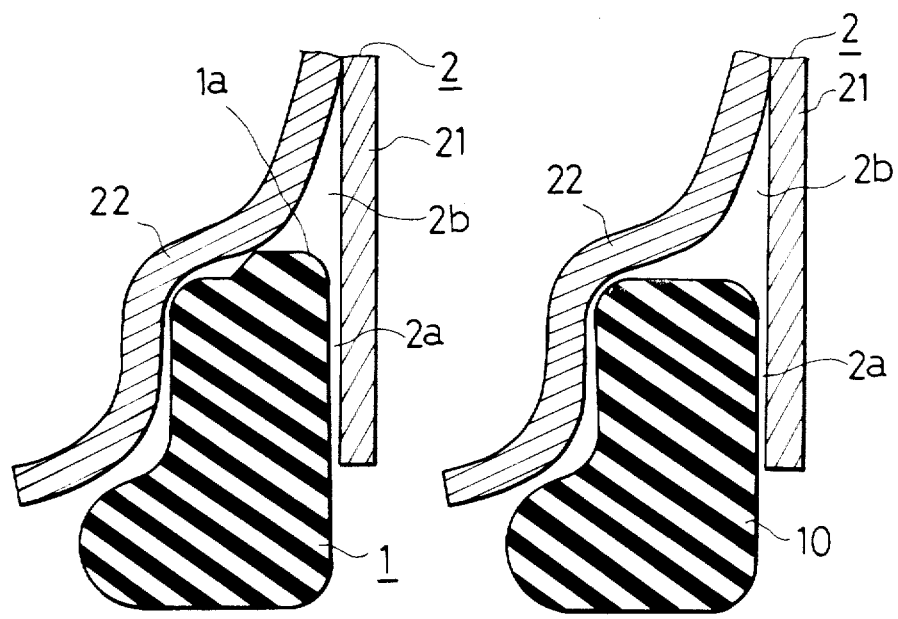
FIG. 3 is an enlarged view of the main part of the gasket and cylinder-head cover shown in FIG. 2.
FIG. 4 is an enlarged view of the main part of the conventional gasket and cylinder-head cover.

The typical cylinder-head cover gasket of the present invention is shown in FIG. 1, which is a plane view. The cross sectional view of the main portion of an engine including such gasket is shown in FIG. 2. The enlarged cross sectional view of such a gasket and the cross section of the groove of a cylinder-head cover is shown in FIG. 3.

The gasket 1 of the present embodiment is an elliptic ring and its plane view is shown in FIG. 1. As shown in FIG. 2, the gasket 1 is inserted to the groove 2a of the cylinder-head cover 2 and fastened with a bolt 4 and nut 5. As apparent from the enlarged cross sectional view of FIG. 3, the upper portion of the inner side projects to be a projecting portion 1a, which is formed in a trianglar shape. The projecting portion 1a is inserted to a wedge shaped space 2b of the sealing groove 2a which is defined by two plates 21, 22 of the cylinder-head cover 2. The lower portion of the gasket 1 is larger than the upper portion, and formed in the approximately same shape with the lower portion of the conventional gasket. The upper portion of the gasket 1 is inserted to a sealing groove 2a and the wedge shaped space 2b is filled with the projecting portion 1a.

Thus described, the cylinder-head cover gasket of the present invention can solve such problem that the fastening strength is lowered because of the upper portion of the gasket running off to the wedge shaped space.

What is claimed is:

1. In a cylinder head cover provided with a peripheral gasket-receiving groove, generally square-shaped in section except for the bottom thereof, defined by two plates, one of which is straight, in section, in its groove-defining part and the other of which converges toward the one to form a wedge-shaped space adjacent the one plate at the bottom of the groove, the combination of a resilient gasket having a portion generally conforming to the square-shaped portion of the groove and having a portion somewhat triangular in section projecting into said space, whereby on compression of said gasket against a cylinder head the entire groove is filled by said gasket so that strong compression thereof is maintained and the seal between said gasket and the cylinder head is strong and effective.

2. The combination according to claim 1 wherein the gasket has a portion projecting out of the groove that is wider in cross section than those portions of said gasket received within said groove.

* * * * *